United States Patent
Qian et al.

(10) Patent No.: US 9,733,825 B2
(45) Date of Patent: Aug. 15, 2017

(54) EAST ASIAN CHARACTER ASSIST

(71) Applicant: Lenovo (Singapore) Pte. Ltd., Singapore (SG)

(72) Inventors: Ming Qian, Cary, NC (US); Jian Li, Chapel Hill, NC (US); Jianbang Zhang, Raleigh, NC (US); Song Wang, Cary, NC (US); Geoffrey Simon Bula, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/533,827

(22) Filed: Nov. 5, 2014

(65) Prior Publication Data
US 2016/0124630 A1 May 5, 2016

(51) Int. Cl.
| G06F 3/0488 | (2013.01) |
| G06K 9/00 | (2006.01) |
| G06F 3/041 | (2006.01) |
| G06F 3/0481 | (2013.01) |
| G06F 3/01 | (2006.01) |

(52) U.S. Cl.
CPC .......... *G06F 3/04883* (2013.01); *G06F 3/018* (2013.01); *G06F 3/0412* (2013.01); *G06F 3/04817* (2013.01); *G06K 9/00416* (2013.01); *G06F 2203/04803* (2013.01); *G06K 2209/011* (2013.01)

(58) Field of Classification Search
CPC combination set(s) only.
See application file for complete search history.

(56) References Cited

U.S. PATENT DOCUMENTS

| 7,983,478 | B2 | 7/2011 | Liu et al. | |
| 2003/0088629 | A1* | 5/2003 | Berkowitz | H04L 67/30 709/206 |
| 2003/0149566 | A1* | 8/2003 | Levin | G10L 15/183 704/257 |
| 2009/0295737 | A1* | 12/2009 | Goldsmith | G06F 3/018 345/169 |
| 2009/0324082 | A1 | 12/2009 | Liu et al. | |
| 2014/0058722 | A1* | 2/2014 | Sun | G06F 17/277 704/9 |
| 2014/0361983 | A1* | 12/2014 | Dolfing | G06F 3/04883 345/156 |
| 2014/0363083 | A1* | 12/2014 | Xia | G06K 9/00436 382/189 |

OTHER PUBLICATIONS

Cai et al., SUBTLEX-CH: Chinese Word and Character Frequencies Based on Film Subtitles, PLoS ONE 5(6): e10729. doi:10.1371/journal, 2010 (8 pages).

* cited by examiner

*Primary Examiner* — Chad Dicke
(74) *Attorney, Agent, or Firm* — Brian J. Pangrle

(57) ABSTRACT

A method can include identifying at least one radical of a plurality of East Asian characters based at least in part on stroke information received via a touch-sensitive display; ranking individual East Asian characters of the plurality of East Asian characters according to their individual frequencies in a corpus; and rendering at least a portion of the ranked individual East Asian characters to the touch-sensitive display.

20 Claims, 14 Drawing Sheets

Kangxi Radicals 200

| | 2F0 | 2F1 | 2F2 | 2F3 | 2F4 | 2F5 | 2F6 | 2F7 | 2F8 | 2F9 | 2FA | 2FB | 2FC | 2FD |
|---|---|---|---|---|---|---|---|---|---|---|---|---|---|---|
| 0 | ⼀ | ⼐ | ⼠ | ⼰ | ⼤ | ⽐ | ⽠ | ⽰ | ⾀ | ⾐ | ⾰ | ⾰ | ⿀ | ⿐ |
| 1 | ⼁ | ⼑ | ⼢ | ⼱ | ⽀ | ⽑ | ⽡ | ⾁ | ⾁ | ⾑ | ⾢ | ⾱ | ⿁ | ⿑ |
| 2 | ⼂ | ⼒ | ⼣ | ⼲ | ⽂ | ⽒ | ⽢ | ⽲ | ⾂ | ⾒ | ⾢ | ⾲ | ⿂ | ⿒ |
| 3 | ⼃ | ⼓ | ⼤ | ⼴ | ⽃ | ⽓ | ⽣ | ⽳ | ⾃ | ⾓ | ⾣ | ⾳ | ⿃ | ⿓ |
| 4 | ⼄ | ⼔ | ⼤ | ⼴ | ⽄ | ⽔ | ⽤ | ⽴ | ⾄ | ⾔ | ⾤ | ⾴ | ⿄ | ⿔ |
| 5 | ⼅ | ⼕ | ⼥ | ⼵ | ⽅ | ⽕ | ⽥ | ⽵ | ⾅ | ⾕ | ⾥ | ⾵ | ⿅ | ⿕ |
| 6 | ⼆ | ⼖ | ⼦ | ⼶ | ⽆ | ⽖ | ⽦ | ⽶ | ⾆ | ⾖ | ⾦ | ⾶ | ⿆ | |
| 7 | ⼇ | ⼗ | ⼧ | ⼷ | ⽇ | ⽗ | ⼴ | ⽷ | ⾇ | ⾗ | ⾧ | ⾷ | ⿇ | |
| 8 | ⼈ | ⼘ | ⼨ | ⼸ | ⽈ | ⽘ | ⽨ | ⽸ | ⾈ | ⾘ | ⾨ | ⾸ | ⿈ | |
| 9 | ⼉ | ⼙ | ⼩ | ⼹ | ⽉ | ⽙ | ⽩ | ⽹ | ⾉ | ⾙ | ⾩ | ⾹ | ⿉ | |
| A | ⼊ | ⼚ | ⼺ | ⼺ | ⽊ | ⽚ | ⽪ | ⽺ | ⾊ | ⾚ | ⾪ | ⾺ | ⿊ | |
| B | ⼋ | ⼛ | ⼫ | ⼻ | ⽋ | ⽛ | ⽫ | ⽻ | ⾋ | ⾛ | ⾫ | ⾻ | ⿋ | |
| C | ⼌ | ⼜ | ⼬ | ⼼ | ⽌ | ⽜ | ⽬ | ⽼ | ⾌ | ⾜ | ⾬ | ⾼ | ⿌ | |
| D | ⼍ | ⼝ | ⼭ | ⼽ | ⽍ | ⽝ | ⽭ | ⽽ | ⾍ | ⾝ | ⾭ | ⾽ | ⿍ | |
| E | ⼎ | ⼞ | ⼮ | ⼾ | ⽎ | ⽞ | ⽮ | ⽾ | ⾎ | ⾞ | ⾮ | ⾾ | ⿎ | |
| F | ⼏ | ⼟ | ⼯ | ⼿ | ⽏ | ⽟ | ⽯ | ⽿ | ⾏ | ⾟ | ⾯ | ⾿ | ⿏ | |

FIG. 2

CJK Radicals Supplement 300

| | 2E8 | 2E9 | 2EA | 2EB | 2EC | 2ED | 2EE | 2EF |
|---|---|---|---|---|---|---|---|---|
| 0 | ⺨ | 尢 | 民 | 纟 | 卝 | 钅 | 飠 | 龙 |
| 1 | 厂 | 允 | 氵 | 罓 | 虎 | 長 | 昝 | 龜 |
| 2 | ⺁ | 巳 | 氺 | 四 | ⻂ | 镸 | 马 | 龟 |
| 3 | 乚 | 幺 | ⺍ | ⺱ | 西 | 长 | 骨 | 龟 |
| 4 | 乁 | 彑 | ⺎ | 冘 | 西 | 门 | 鬼 | |
| 5 | 亻 | 彐 | ⺏ | 皿 | 见 | 自 | 鱼 | |
| 6 | 几 | ⺔ | 斗 | 羊 | 角 | 阝 | 鸟 | |
| 7 | 凢 | 小 | ⺧ | 羊 | 肉 | ⻗ | 卤 | |
| 8 | 亇 | 扌 | 犭 | 丰 | 辶 | 青 | 麦 | |
| 9 | 刂 | 攵 | 王 | 歨 | 贝 | 韦 | 黄 | |
| A | 卜 | | 疋 | 龶 | 跙 | 页 | 黾 | |
| B | 卩 | 旡 | 四 | 畫 | 车 | 风 | 齐 | |
| C | 丷 | ⺕ | 示 | 月 | 辶 | 飞 | 齐 | |
| D | 丷 | 月 | 衤 | 臼 | 辶 | 食 | 齿 | |
| E | 兀 | 步 | 竹 | 艹 | 辶 | 飠 | 齿 | |
| F | 允 | 母 | 糹 | 艹 | 阝 | 飠 | 竜 | |

FIG. 3

Corpus Circuitry 640

Rank: 1 radical 19 力+5, 7 Strokes
"encourage"

Rank: 2 radical 19 力+5, 7 Strokes
"exert"

Rank: 3 radical 19 力+7, 9 Strokes
"courageous"

EAST ASIAN CHARACTER ASSIST

TECHNICAL FIELD

Subject matter disclosed herein generally relates to technologies and techniques associated with East Asian characters.

BACKGROUND

A device can include a display that can be used for writing. For example, consider a touch sensitive display that can be written on using a finger, a stylus or other tool.

SUMMARY

A method can include identifying at least one radical of a plurality of East Asian characters based at least in part on stroke information received via a touch-sensitive display; ranking individual East Asian characters of the plurality of East Asian characters according to their individual frequencies in a corpus; and rendering at least a portion of the ranked individual East Asian characters to the touch-sensitive display. Various other devices, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 2 is an example of a table of radical information;
FIG. 3 is an example of a table of radical information.

DETAILED DESCRIPTION

Figure 1:
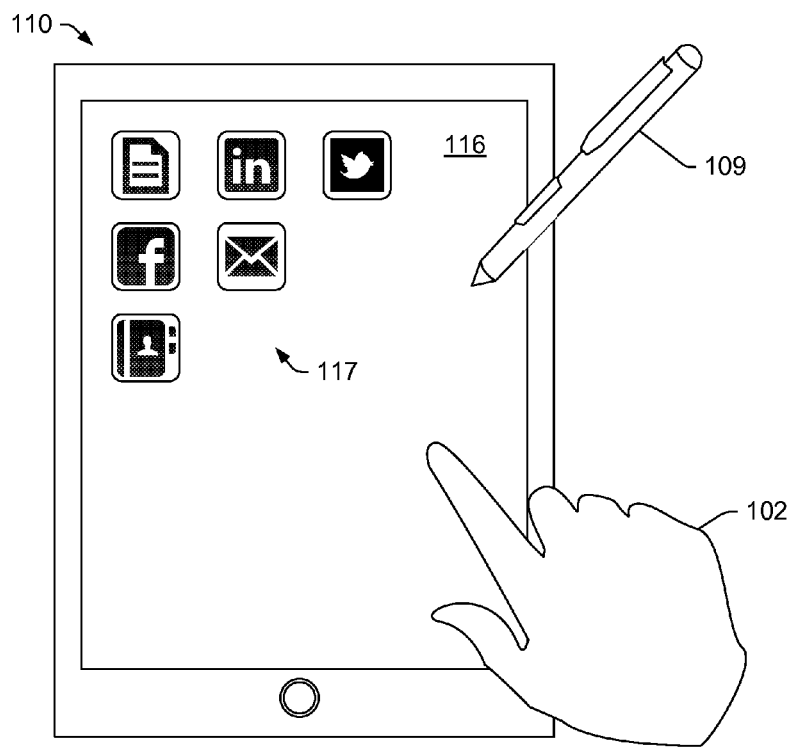
FIG. 1 is a diagram of an example of a device.
Figure 1:
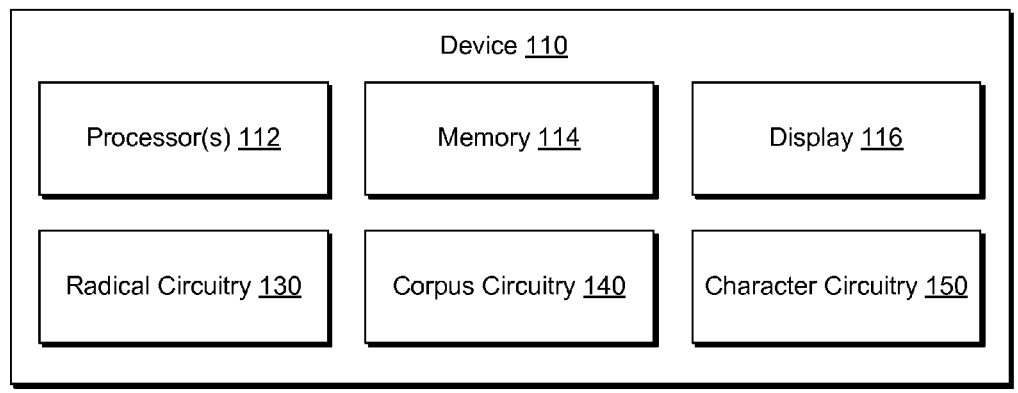

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

As an example, a method can include identifying one or more Chinese radicals. A Chinese radical (e.g., Chinese: 部首; pinyin: bùshǒu; literally "section header") is a graphical component of a Chinese character, for example, under which the character may be listed in a Chinese dictionary. For example, to write the character 钱, the radical 钅 may be written first (e.g., a left part) followed by a right part of the character.

As an example, once a device identifies the radical 钅, it may access information to determine what one or more characters include that radical. As an example, as to such one or more characters, a device may access information such as frequency information, which may be derived from a corpus or corpora, which may be personalized (e.g., based at least in part on writings of a person such as a user of a device, an account holder, etc.). In turn, the device may render the one or more characters to a display in an order that may be a ranked order based at least in part on the frequency information.

As an example, for the radical 钅, there are about 243 words (e.g., of one or more characters) that include this radical. As to personal use of the words, a person may use, for example, perhaps about 30 to about 40 of them. As an example, where used by the person, these words may appear in a personalized corpus or personalized corpora. As to frequency of use, some of the words may be used infrequently while a few may be used frequently. As an example, to reduce a number of strokes to be made by a user, a method can include rendering a "hint list" to a display, for example, based at least in part on frequency of use (e.g., as in a personalized corpus). As an example, a method can include rendering a hint list to a display where entries in the hint list are based at least in part on usage frequency. As an example, a hint list may be of the order of tens of characters (e.g., or words or phrases). As an example, a hint list may be of the order of about 10 characters (e.g., or words or phrases) or less.

As an example, a method may assess stroke information as to, for example, stroke direction, stroke number, stroke order, etc. As an example, a radical may be identified based at least in part on stroke information (e.g., directly and/or information derived therefrom). As an example, a complete radical may be written using a touch sensitive display (e.g., via finger, via stylus, etc.) and identified. In turn, once identified, one or more characters may be list candidates and ordered based at least in part on frequency information (e.g., as derived from a corpus or corpora). In such an example, at least a portion of the ordered list of candidates may be rendered to a display (e.g., to include a most frequent candidate and a number of additional candidates).

As an example, a device may include circuitry that can expedite speed and throughput for handwriting Chinese characters, which may be determined, for example, via stroke count savings, etc. As an example, a candidate may be based at least in part on a prior entered or selected character, which may, for example, form part of a phrase of words. For example, frequency information may include frequency of character orders where such information may be used to determine an order of candidates that include a radical that has been identified.

FIG. 1 shows an example of a hand 102, a stylus 109 and a device 110 that may sense input from the hand 102 (e.g., via a finger or fingers), from the stylus 109 and/or one or more other tools.

As shown in the example of FIG. 1, the device 110 includes one or more processors 112; memory 114 operatively coupled to at least one of the processors 112; a touch-sensitive display 116 operatively coupled to at least one of the one or more processors; radical circuitry 130 that identifies at least one radical of a plurality of East Asian characters based at least in part on stroke information received via the touch-sensitive display 116; corpus circuitry 140 that ranks individual East Asian characters of the plurality of East Asian characters according to their individual frequencies in a corpus; and character circuitry 150 that renders at least a portion of the ranked individual East Asian characters to the touch-sensitive display.

As an example, the device 110 may include operating system instructions stored in the memory 114 and executable by at least one of the one or more processors 112 to establish an operating system environment. As an example, such an operating system environment may allow for execution of applications (e.g., application code, etc.). In the example of FIG. 1, various icons 117 are illustrated as being rendered to the touch-sensitive display 116 where selection of one of the icons may launch an application. In such an example, the corpus circuitry 140 may select a corpus, which may be a personalized corpus as associated with a user having used the particular application. For example, upon launching of an application that can receive input of radicals, characters, etc. via the touch-sensitive display 116, the corpus circuitry 140 may receive a signal that indicates which application is being used such that the corpus circuitry 140 can select an appropriate corpus. As an example, where a word processing application is launched, the corpus circuitry 140 may select an appropriate corpus based at least in part on a file path (e.g., drive, directory, folder, etc.).

In the example of FIG. 1, a corpus and/or frequency information may exist particular to a FACEBOOK™ application (e.g., based on posts, etc.), a corpus and/or frequency information may exist particular to an email application (e.g., based on emails, etc.), a corpus and/or frequency information may exist particular to a LINKEDIN™ application (e.g., based on bios, messages, etc.), a corpus and/or frequency information may exist particular to a TWITTER™ application (e.g., based on "tweets", etc.), a corpus and/or frequency information may exist particular to a contact in a contact database (e.g., based on communications with that contact, etc.), a corpus and/or frequency information may exist particular to a group of contacts in a contact database (e.g., based on communications with those contacts, etc.), etc. In such examples, a corpus may be a personalized corpus that includes entries based on a user's input, whether via a keyboard, a finger, a stylus, etc. In such examples, frequency information may be personalized, for example, based on analysis of a corpus that includes entries based on a user's input, whether via a keyboard, a finger, a stylus, etc.

As an example, the device 110 may identify at least one radical of a plurality of East Asian characters based at least in part on stroke information received via the touch-sensitive display where the stroke information may be a complete radical. For example, to facilitate identification of a radical, a user may draw an entire radical. In such an example, based on the entire radical (e.g., a complete radical or completed radical), the device 110 may then access frequency information for characters that include the radical such that a ranked number of individual East Asian characters can be rendered to the touch-sensitive display 116. In such an example, the frequency information may be generated from a personalized corpus, which may be a personalized corpus associated with a particular application, associated with communications with a contact or contacts, associated with a file path (e.g., drive, directory, folder, etc.), etc.

As an example, where an entire radical is written (e.g., received by a device), identification of the radical may be expedited and may occur with greater certainty when compared to an approach that operates on a partially completed radical (e.g., a partial radical). In such an example, candidate characters can be selected that include the radical and at least a portion of those candidate characters may be rendered to a display, for example, in an order that is based on a user's own frequency of use of the characters (e.g., based on a personalized corpus).

As an example, the device 110 may be defined according to a form factor. For example, the device 110 may be defined with respect to a tablet form factor, a convertible form factor (e.g., a portion of a computing system, etc.), a mobile form factor (e.g., of a cellular phone device, etc.), a kiosk form factor, etc.

FIG. 2 shows an example of a table of Kangxi radicals 200. As shown in the example of FIG. 2, radicals may be organized with respect to codes. For example, the table 200 is organized according to Unicode, which is standard for encoding, for example, for representation and handling of text expressed in a writing system. In the table 200 of FIG. 2, the 214 Kangxi radicals are encoded in the Unicode U+2F00-2FDF range.

The Kangxi radicals of the table 200 include 214 Chinese characters. As an example, radicals may be organized according to one or more aspects of the radicals themselves (e.g., absent meaning) such as, for example, stroke count, stroke count order, etc. As an example, a radical may be associated with, for example, a number (e.g., radical number "61").

Individual Kangxi radicals occur in at least five of the Kangxi dictionary listing of 47,035 characters. For example, seven of the 214 radicals form more than 1,000 characters each with the highest number of characters derived from an individual radical is 1,902 (the radical 艸(艹)) and the lowest number of characters derived from an individual radical is five (the radical 艮).

FIG. 3 shows an example of a table of so-called Chinese, Japanese and Korean (CJK) radicals 300 (e.g., the CJK Radicals Supplement). The radicals of the table 300 (e.g., of the CJK Radicals Supplement) includes 115 radical components.

The table 200 of FIG. 2 and the table 300 of FIG. 3 may be referred to as "radical blocks", for example, the tables 200 and 300 may be referred to collectively as two CJK radicals blocks: the Kangxi radicals block that includes 214 standard radicals used in the Kangxi dictionary and the CJK radicals supplement block that includes 115 radical components used in other dictionaries. As an example, another radicals block is the Yi radicals block that includes 55 radicals used to index Yi characters in dictionaries of the Yi script. As an example, Vietnamese may be included in a block, for example, a CJKV block.

As an example of another dictionary, consider the Xinhua dictionary (e.g., Xinhua Zidian or 新華字典), which includes a version with 189 radicals and a version with more radicals (e.g., about 260 radicals).

As an example, a corpus may be a text corpus. As an example, a text corpus may be an organized representation of information. As an example, a text corpus may be a structured set of texts. As an example, a corpus may be monolingual (e.g., a monolingual corpus) or multilingual (e.g., a multilingual corpus). As an example, a corpus may include parsed information, for example, text in the form of phrases, sentences, paragraphs, etc., parsed to a level of characters.

As an example, characters in a corpus may be analyzed with respect to their frequency. A frequency may be a mathematically determined value. For example, a frequency may be a number of occurrences of a character in a corpus. As another example, a frequency may be a frequency that is normalized. For example, a frequency may be a number of occurrences per number of characters in a corpus (e.g., X occurrences per Y characters). In such an example, the frequency may be independent of corpus size.

As an example, a frequency may be based at least in part on Zipf's law, which pertains to the proposition that given some corpus of natural language utterances (e.g., or writings), the frequency of a word is inversely proportional to its rank in a frequency table. Thus, a most frequent word may be expected to occur approximately twice as often as a second most frequent word, three times as often as a third most frequent word, etc. For example, in the Brown Corpus of American English text, the word "the" is the most frequently occurring word, and by itself accounts for nearly 7% of all word occurrences (69,971 out of slightly over 1 million). As to Zipf's law, the second-place word "of" accounts for slightly over 3.5% of words (36,411 occurrences), followed by "and" (28,852). As an example, 135 vocabulary items can account for half of the Brown Corpus.

As to an East Asian writing system such as the Chinese writing system (e.g., of Kangxi characters), a character represents a syllable, which may be a morpheme (e.g., a smallest meaningful element) and there may be no spaces between words. As an example, a Chinese word may be a disyllabic compound word.

As an example, information may be analyzed to determine frequencies for characters and/or words (e.g., including phrases). For example, the information may be a corpus or corpora.

Figure 4:
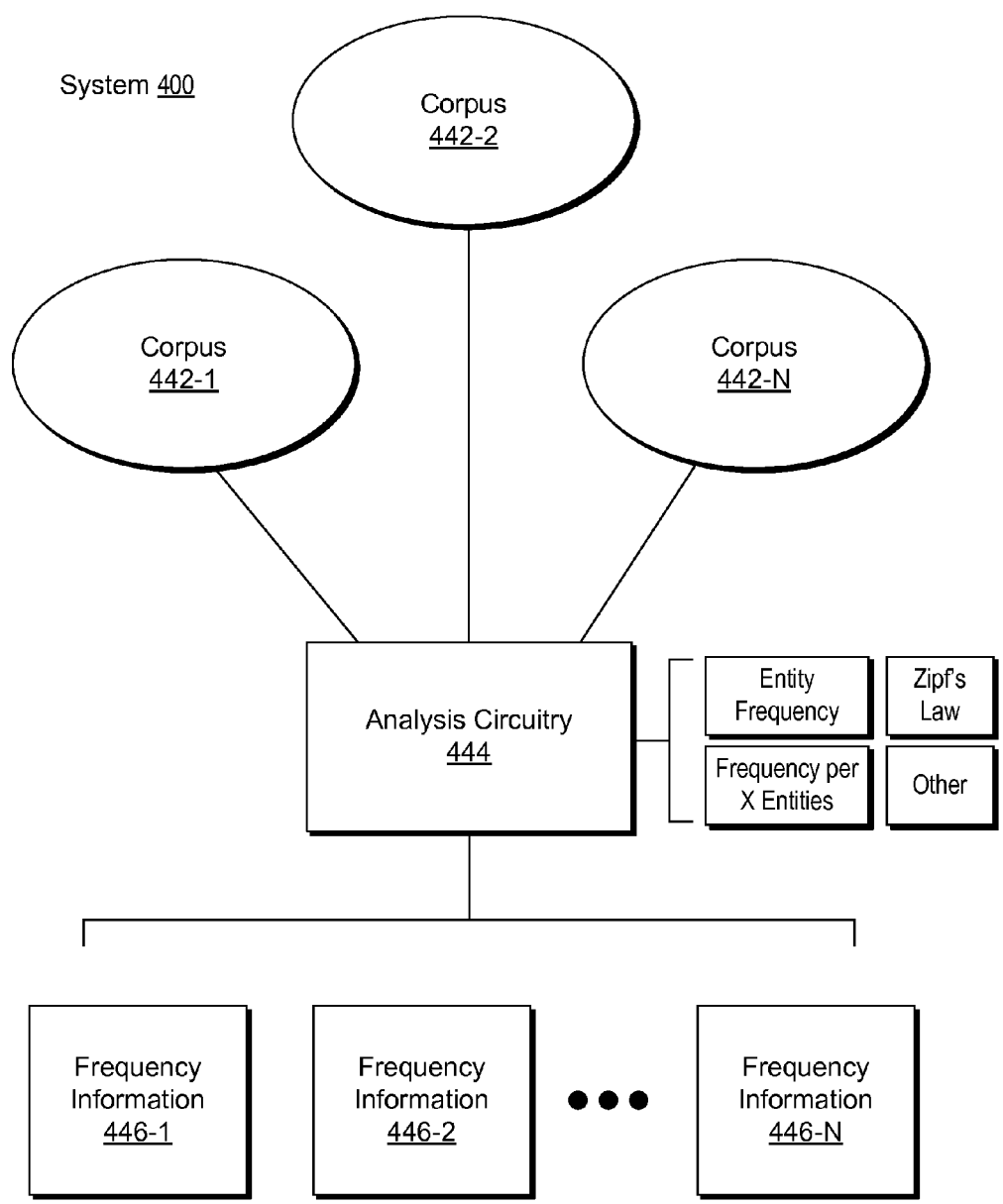
FIG. 4 is a diagram of an example of a system.

FIG. 4 shows an example of a system 400 that includes one or more corpora 442-1, 442-2 and 442-N, analysis circuitry 444 and one or more sets of frequency information 446-1, 446-2 and 446-N. In the example of FIG. 4, the analysis circuitry 444 may include one or more modules that can analyze information in one or more corpora as to frequency. For example, the analysis circuitry 444 can include an entity frequency module that can determine a number of occurrences of individual entities such as, for example, radicals, characters, words, phrases, etc.; a frequency per X entities module that can determine a number of occurrences of an entity per a number of entities; a Zipf's law module that can analyze information based at least in part on Zipf's law (e.g., to determine a cut-off, etc.); and one or more other modules. As to a Zipf's law analysis, frequency information may be determined and, for example, stored as a set of frequency information according to a threshold that can act to cut-off frequencies, etc. below the threshold.

As an example, a threshold may be a nth-place threshold, which may aim to determine and store frequency information for a top "n" number of character candidates for a radical. As an example, a threshold may be a user-selectable parameter of a system, which may be based at least in part on one or more other factors. As an example, where a display includes a graphical user interface (e.g., a panel) that may be limited in size for rendering of candidate characters of a certain font size, a threshold may optionally be based at least in part on the size (e.g., and/or font size). As an example, a "law of diminishing returns" effect may exist as well. For example, one or more time to analyze, time to associate, time to render, time to store, etc. may increase in relationship to a number of candidate entities "n". As an example, a system may implement a threshold that is a value of approximately 10 or less. As an example, a system may implement a threshold that is a value of approximately 5 or less. As an example, a system may implement a threshold value that is four or, for example, three. As an example, a lower threshold value may expedite updating and make for a more dynamic user experience (e.g., rendering in response to inputs, selections, etc.). As an example, a lower threshold value may provide for implementation using lesser computing resources (e.g., a "lightweight" implementation).

Figure 5:
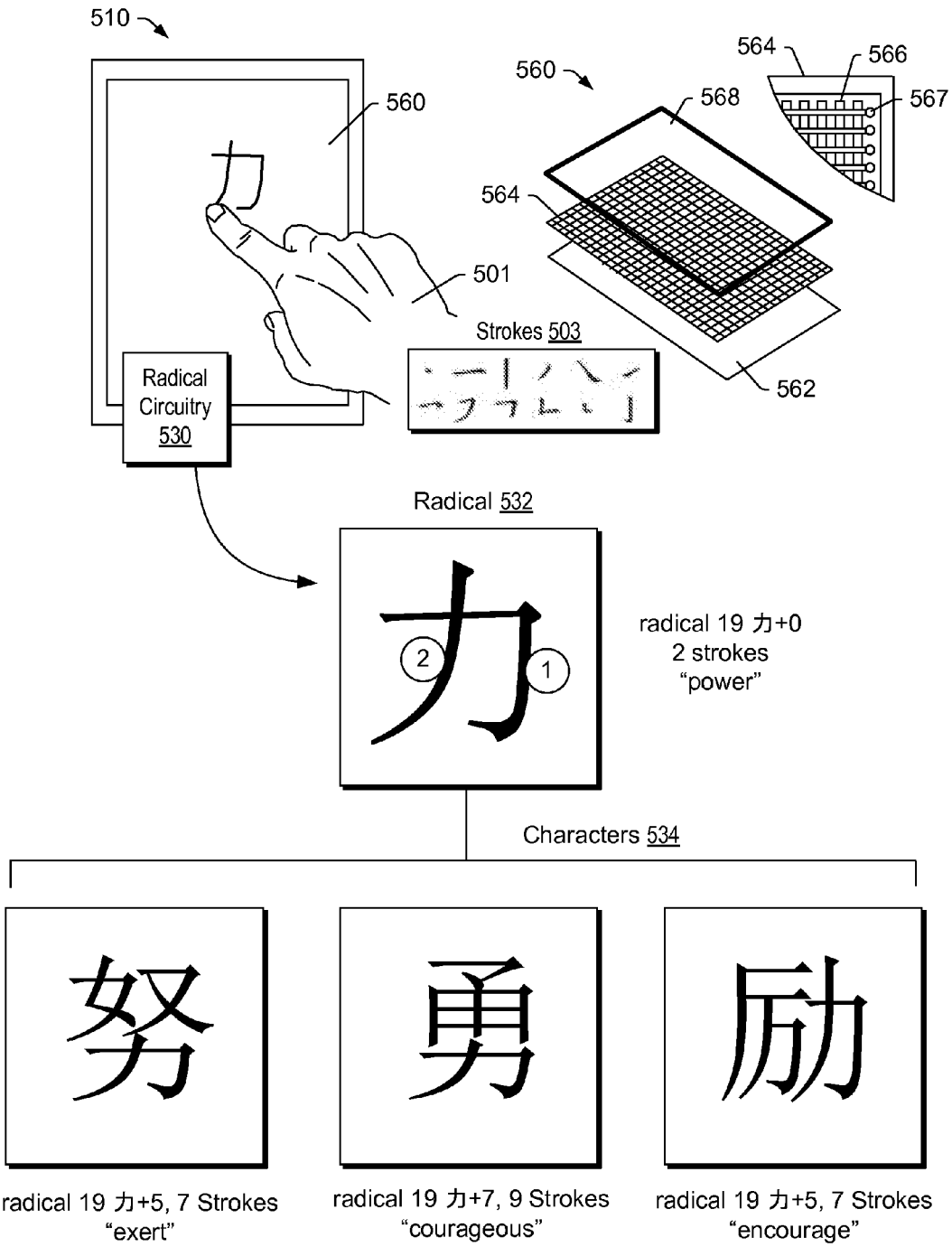
FIG. 5 is a diagram of an example of a device that includes an example of radical circuitry.

FIG. 5 shows an example of a hand 501, examples of strokes 503, an example of a device 510 that includes radical circuitry 530 and a touch sensitive display 560 that includes a display surface element 568. As shown, the display 560 can include circuitry such as, for example, a display panel 562 and touch circuitry 564, which may be covered at least in part by the display surface element 568. As an example, the touch circuitry 564 can include sense circuitry 566 and drive circuitry 567, which may form a grid. In such an example, the circuitry 566 and 567 may be relatively translucent to allow for image information rendered to the display panel 562 to be visible via through the display surface element 568 (e.g., cover glass, cover crystal, cover polymer, etc.).

In the example of FIG. 5, a finger of the hand 501 of a user may move while being in contact with the display surface element 568 (e.g., or in close proximity thereto) to form one or more strokes (see, e.g., the strokes 503). In such an example, the touch circuitry 564 may sense positional information, for example, according to a grid (e.g., a two-dimensional grid with coordinates). In the example of FIG. 5, the touch circuitry 564 can output stroke information (e.g., responsive to sensing of positional information as input by a user moving a finger, stylus, etc.). As shown, the radical circuitry can identify at least one radical 532 of a plurality of East Asian characters 534 based at least in part on stroke information received via the touch-sensitive display 560 of the device 510. Such a process may be referred to, for example, as a completion process where a character is completed based at least in part on a radical. As an example, a completion process may be performed automatically by a device to, for example, render one or more "completed" candidates to a display. In such an example, the process may be referred to as an auto-completion process where, for example, a user selects As to identification of a radical based at least in part on stroke information, consider a pattern recognition algorithm that receives the stroke information and that compares a pattern formed at least in part by the stroke information to stored pattern information. As an example, a pattern recognition algorithm may operate using a planar coordinate system, for example, consider a pixel array in an x,y-coordinate plane. As an example, a pattern recognition algorithm may include scaling. For example, a stored pattern may be scaled and/or stroke information may be scaled for purposes of comparison.

As an example, radical circuitry may implement an "on-line" process. An on-line process can include identifying a radical as it is being written and/or after it has been written (e.g., via a finger, a stylus, etc.). As an example, an algorithm may include detecting tip movements and/or up/down events. As an example, an algorithm may interpret stroke information as "digital ink" (e.g., a digital representation of a handwritten radical, etc.). As an example, an identified radical may include a code such as, for example, a Unicode. As an example, radical circuitry may output a code for an identified radical.

As an example, a device can include circuitry that can generate signals response to a finger, a stylus, etc. being positioned and/or moved with respect to a display, preprocessing of such signals, feature extraction and classification (e.g., as a radical, a code, etc.). As an example, preprocessing may act to discard irrelevant information (e.g., information not directly germane to classification). As an example, preprocessing may include binarization, normalization, sampling, smoothing and denoising. As an example, feature extraction may operate on information that may be in the form of one or more points, vectors, etc. As to classification, as an example, one or more extracted features may be mapped to a class (e.g., or classes), which may include one or more codes.

As an example, radical circuitry may operate in real-time while stroke information is being generated via a touch sensitive display or, for example, radical circuitry may operate in response to a completion signal that indicates that a complete radical has been input via a touch sensitive display. For example, a user may make a stroke or strokes to form a complete radical and then lift his or her finger, stylus, etc. to allow for sensing of an input break (e.g., of a time greater than about a second). In response to an input break, radical circuitry may then identify at least one radical based at least in part on stroke information. As another example, a user may input user input that a touch sensitive display can process to form a radical completion signal. For example, user input may include one or more of, for example, a gesture, a double tap, selection of a graphical control, etc., to indicate that a radical has been entered. In such an example, in response to receipt of a radical completion signal, radical circuitry may then process stroke information to identify at least one radical.

In the example of FIG. 5, the radical 532 is identified by the radical circuitry 530 based at least in part on receipt of stroke information as generated by the touch sensitive display 560 (e.g., at least in part via the touch circuitry 564). As shown, the identified radical 532 is a radical of the plurality of individual East Asian characters 534. Specifically, where radicals are numbered (e.g., from 1 to 214), the radical 532 (reference numeral in FIG. 5) is radical 19 (力), which is composed of 2 strokes; and the characters 534 include radical 19 (力) as well as being formed by one or more additional strokes (e.g., 7 strokes for the leftmost character (努), 9 strokes for the center character (勇) and 7 strokes for the rightmost character (励)).

As an example, identification of at least one radical based at least in part on stroke information can include associating a radical that includes a Unicode and accessing a Unicode range for the radical's Unicode wherein the Unicode range corresponds to the individual East Asian characters. For example, the radical 19 (力) includes a Unicode U+529B, the leftmost character (努) includes a Unicode U+52aa, the center character (勇) includes a Unicode U+fa76 and the rightmost character (励) includes a Unicode U+F97F.

Figure 6:
FIG. 6 is a diagram of an example of corpus circuitry.
Figure 6:
Figure 6:
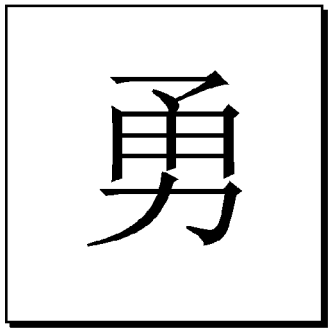

FIG. 6 shows an example of corpus circuitry 640 along with an example of a ranking of characters such as the characters 534 of the example of FIG. 5. In such an example, the corpus circuitry 640 ranks individual East Asian characters of the plurality of East Asian characters (e.g., consider the characters 534) according to their individual frequencies in a corpus (see, e.g., the corpora 442-1, 442-2 and 442-N). As an example, a corpus may be a personalized corpus. For example, a personalized corpus may be a corpus that includes writing, speech, communications, etc. of a person, which may be one or more of an owner of a device, associated with an account of a device (e.g., a user account), a user of a device, etc. As an example, a corpus may be a personalized corpus associated with a person that may also include information from one or more other persons, for example, that have transmitted such information (e.g., messages such as cellular text, email, instant messaging, etc.) to an address (e.g., SKYPE™ communication moniker, IM, phone number, email address, etc.) associated with the person of the personalized corpus.

As an example, a corpus may be a local corpus, for example, stored in local memory of a device. As an example, a corpus may be a remote corpus, for example, stored in remote memory such as memory of a cloud-based device, memory operatively coupled a server, etc. As an example, a corpus may be local and remote. As an example, a portion of a corpus may be local to a device and a portion of a corpus may be remote to the device.

As an example, corpus circuitry such as the corpus circuitry 640 of the example of FIG. 6 may include frequency information or may access frequency information. For example, the corpus circuitry 640 may include or may access one or more sets of frequency information such as, for example, one or more of the sets of frequency information 446-1, 446-2 and 446-N of the example of FIG. 4. As an example, the corpus circuitry 640 of FIG. 6 may rank characters based at least in part on frequency information derived from one or more corpora. As an example, the corpus circuitry 640 of FIG. 6 may rank characters based at least in part on frequency information derived from a personalized corpus or personalized corpora.

In the example of FIG. 6, the three characters 534 of FIG. 5 are ranked in an order from one to three with a rank of "1" being the most frequently occurring of the three characters, at least in part according to occurrence of that character in a personalized corpus or personalized corpora.

Figure 7:
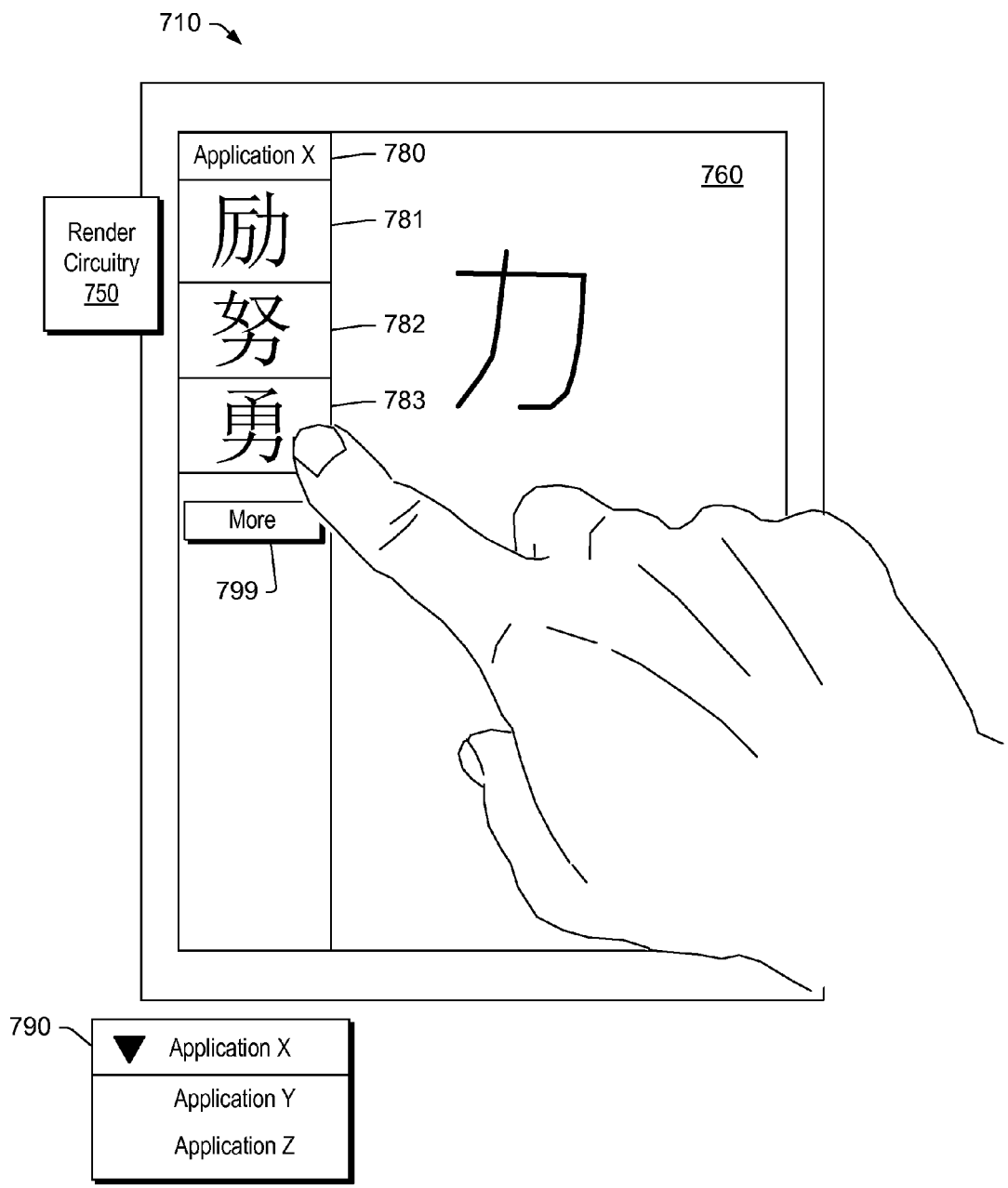
FIG. 7 is a diagram of an example of a device that includes an example of render circuitry.

FIG. 7 shows an example of a device 710 that includes render circuitry 750 and a touch sensitive display 760. As shown, the render circuitry 750 can render at least a portion of ranked individual East Asian characters to the touch-sensitive display 760. As an example, the render circuitry 750 can render a graphical user interface (GUI) to a portion of the touch sensitive display 760, for example, based at least in part on execution of instructions by a processor of the device 710 (e.g., where the instructions may be stored in memory of the device 710 where the memory is operatively coupled to the processor).

In the example of FIG. 7, the GUI includes an optional field 780 that may indicate an application such as "Application X". Such an indication may be for an application for which a personalized corpus exists (see, e.g., the icons 117 of FIG. 1). For example, consider an email application (e.g., the OUTLOOK™ electronic mail application, etc.) where text in emails sent and/or received (e.g., associated with an account or accounts of a person) form, at least in part, a personalized corpus.

FIG. 7 also shows an example graphical user interface (GUI) 790 that may include a menu with menu items where the items may correspond to different personalized corpora (e.g., sets of frequency information for different personalized corpora). In such an example, a user may select a different application, a different set of frequency information, etc., which, in turn, may provide for a different ranking and optionally one or more different characters. As an example, consider one set of frequency information as being associated with a personalized corpus of email communications with a particular entity (e.g., an individual, a company, an organization, a department, etc., optionally indicated via domain name information) and consider another set of frequency information as being associated with a personalized corpus of email communication with a different entity (e.g., an individual, a company, an organization, a department, etc., optionally indicated via domain name information). Where an email communication is to be distributed to both entities, a user may select a set of frequency information (e.g., a personalized corpus) that is best suited to circumstances. For example, if one entity is quite formal while the other quite informal as to use of language, to ensure that formality is maintained, a user may select a set of frequency information (e.g., a personalized corpus) that corresponds to communications with the entity that prefers formality.

As an example, where an application includes an address field or address fields, upon entry of one or more addresses, the application may automatically select a personalized corpus from a plurality of personalized corpora. In such an example, selection of a corpus may act to select a set of frequency information derived from that corpus where the set of frequency information may be used, for example, to rank characters based at least in part on an identified radical.

As mentioned, a GUI may be sized such that a particular number of characters can be suitably rendered to a display. In the example of FIG. 7, the number of characters is three, as represented by a highest rank field 781, a second highest rank field 782 and a third highest rank field 783. As an example, where a user may desire additional "suggestions", a GUI may include a graphical control 799 that can cause one or more additional characters to be rendered to the display 760.

Figure 8:
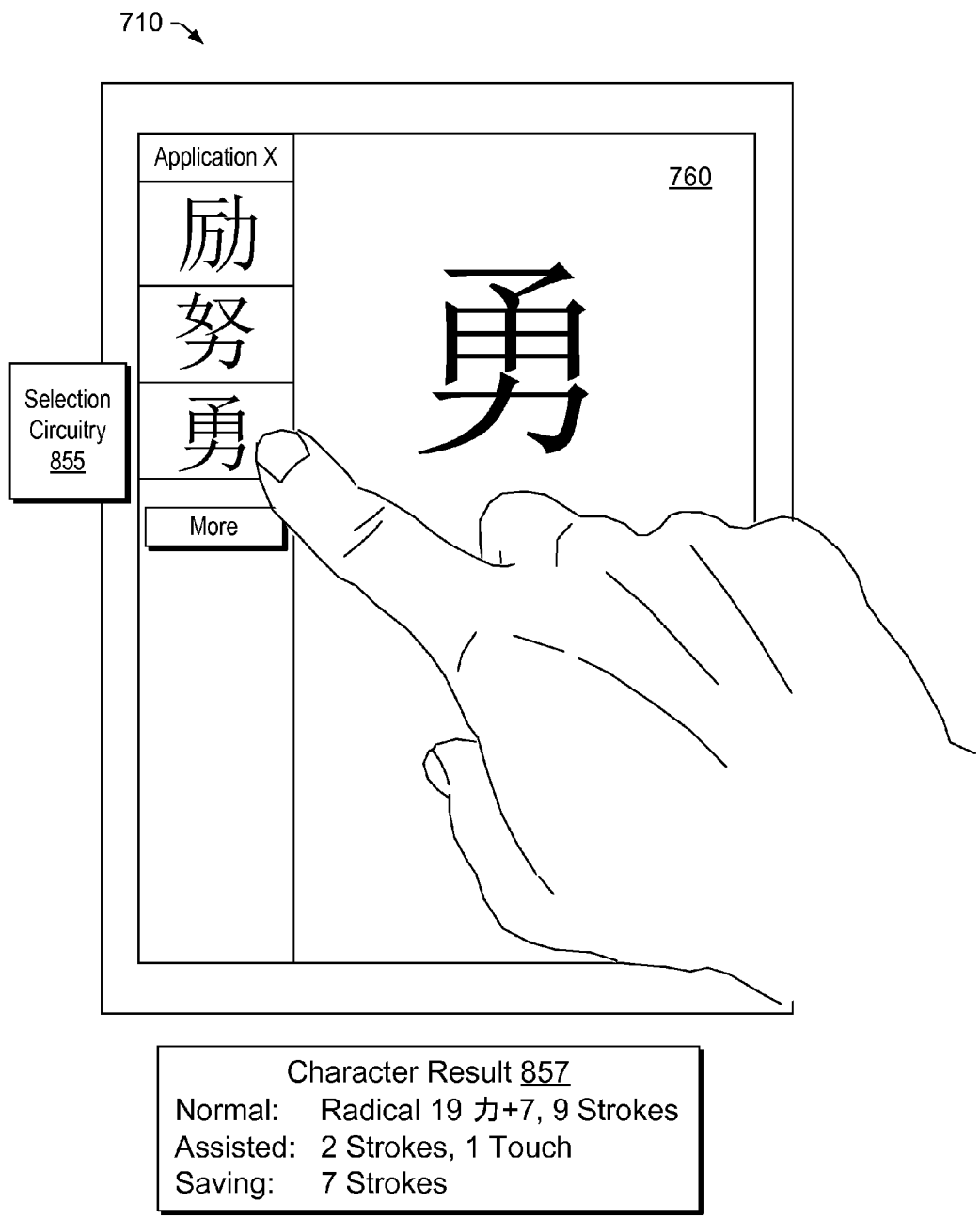
FIG. 8 is a diagram of the example of the device of FIG. 7.

FIG. 8 shows an example scenario where the device 710 includes selection circuitry 855 that, for example, acts to select one of the characters rendered to the display 760. As an example, the selection circuitry 855 may respond to receipt of a signal generated by the display 760 upon a touch in a particular region of the display 760. As an example, selection circuitry may respond to a signal transmitted via audio input circuitry (e.g., a microphone, etc.). In such an example, the signal may be in response to an utterance of a rank order rather than an utterance of the phonic pronunciation of a character itself. For example, if a highest rank character is to be selected, as rendered to a highest rank field, a user may utter "highest" or "one" (e.g., in one or more languages). In such an example, the "voice recognition" of the device may be lightweight and relatively robust as commands may be few (e.g., corresponding to a number of fields for ranked characters rather than to a plethora of characters themselves).

In the example of FIG. 8, the user has selected the third highest ranked character, which may then be rendered to another panel of the display 760, which may then replace the input strokes as handwritten to form the shape of the radical (e.g., radical 19 ((力)).)).

In the example of FIG. 8, a block 857 shows a character result that indicates, through an assisted technique, to reach the selected character rendered to the display 760, a total of two strokes were made by a user along with a single touch to select the desired character. In such an example, a savings of 7 strokes may be realized. Where a touch may be considered a movement akin to a stroke, in terms of efficiency of an assisted technique, the savings may be akin to 6 strokes. Thus, where a user may be in a rush, on the move, operating via a mobile device, etc., input of characters may be expedited.

As an example, where a user is in a vehicle, walking, etc. while holding a mobile device, making coordinated and "accurate" strokes may be more difficult due to motion. Thus, where an assisted technique can diminish a total number of strokes, user experience may be enhanced.

Figure 9:
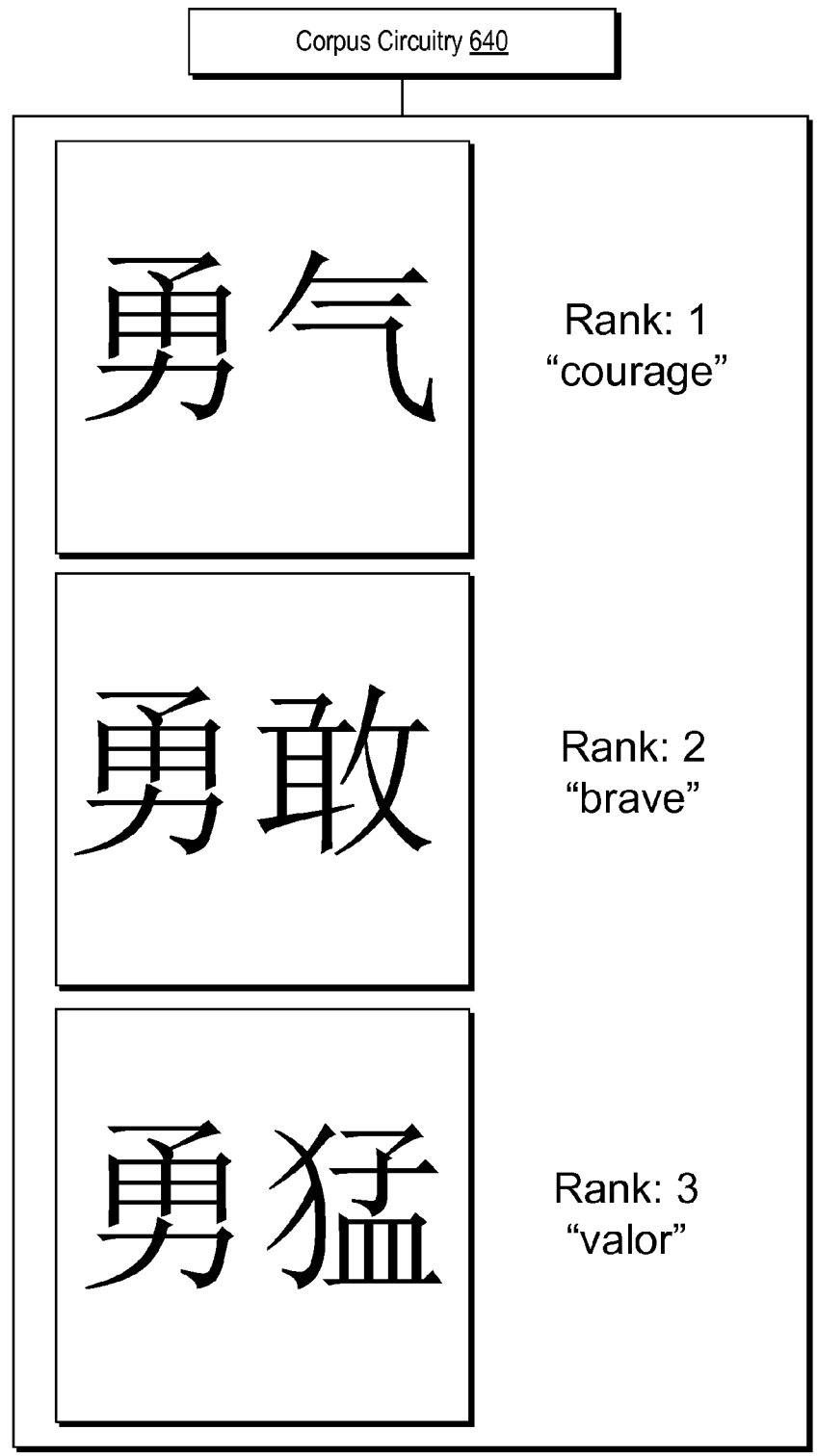
FIG. 9 is a diagram of an example of the corpus circuitry of FIG. 6.

FIG. 9 shows an example scenario where the corpus circuitry 640 may include ranking sets of characters where each set includes at least two characters. Such an example may be referred to as a word or phrase scenario. As an example, such a process may follow a scenario such as the scenario of FIG. 8 where a selection of a single character is made.

In the example of FIG. 9, each of the ranked sets includes the character 勇 (e.g., which includes a Unicode U+fa76). Further, the highest ranked set 勇气 includes the character 气, the second highest ranked set 勇敢 includes the character 敢 and the third highest ranked set 勇猛 includes the character 猛. In the example of FIG. 9, these additional characters are determined because of their association with the character 勇 in a corpus or corpora, which may be a personalized corpus or personalized corpora.

Figure 10:
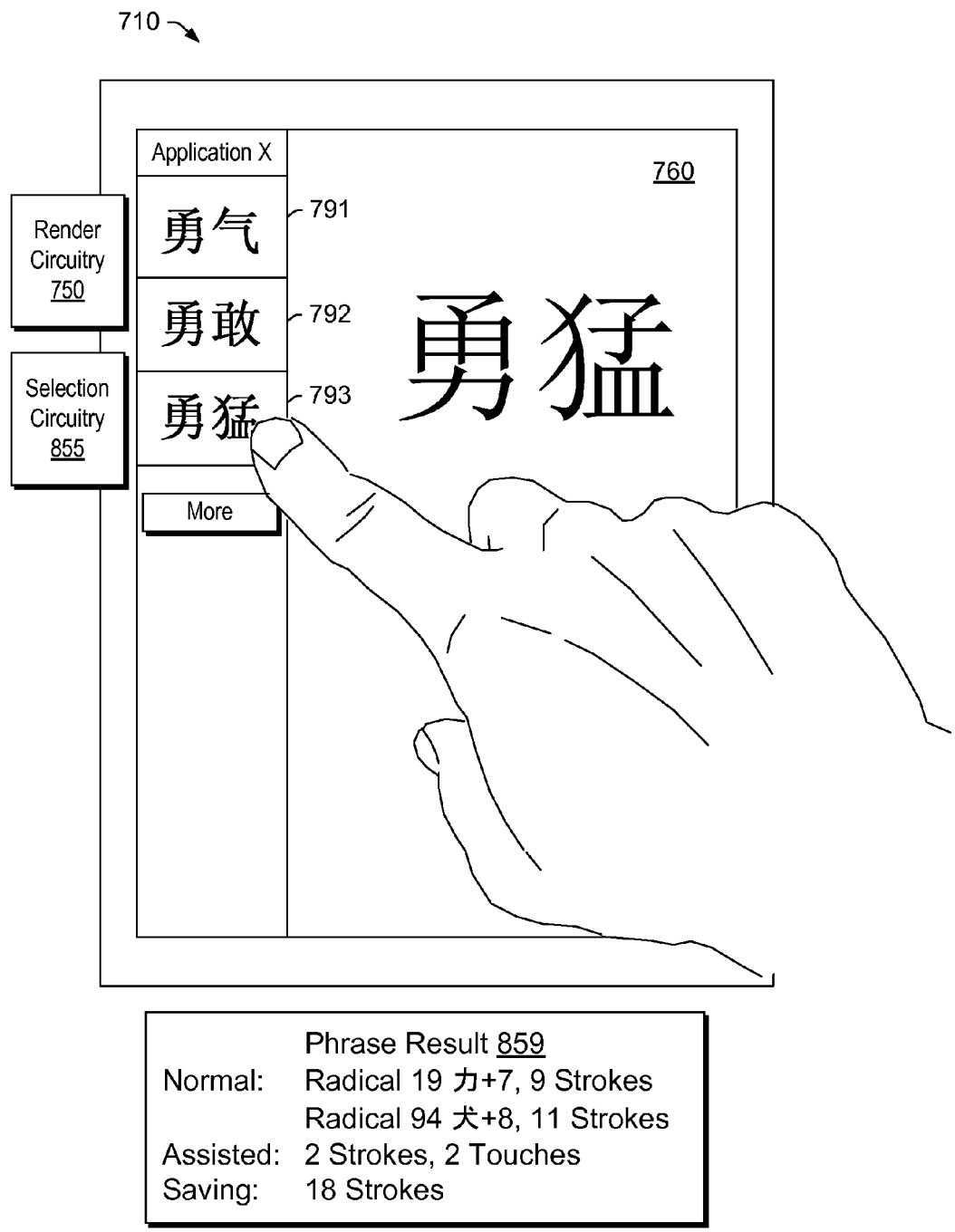
FIG. 10 is a diagram of an example of the device of FIG. 7.

FIG. 10 shows an example of a scenario that may follow from the scenario of FIG. 8 where, for example, the ranked character sets are rendered to fields 791, 792 and 793 as character set fields. Where a user selects the field 793, the result, as shown in a block 859, may be a savings of 18 strokes or, for example, accounting for "touches" (e.g., selections), the savings may be akin to 16 strokes.

Figure 11:
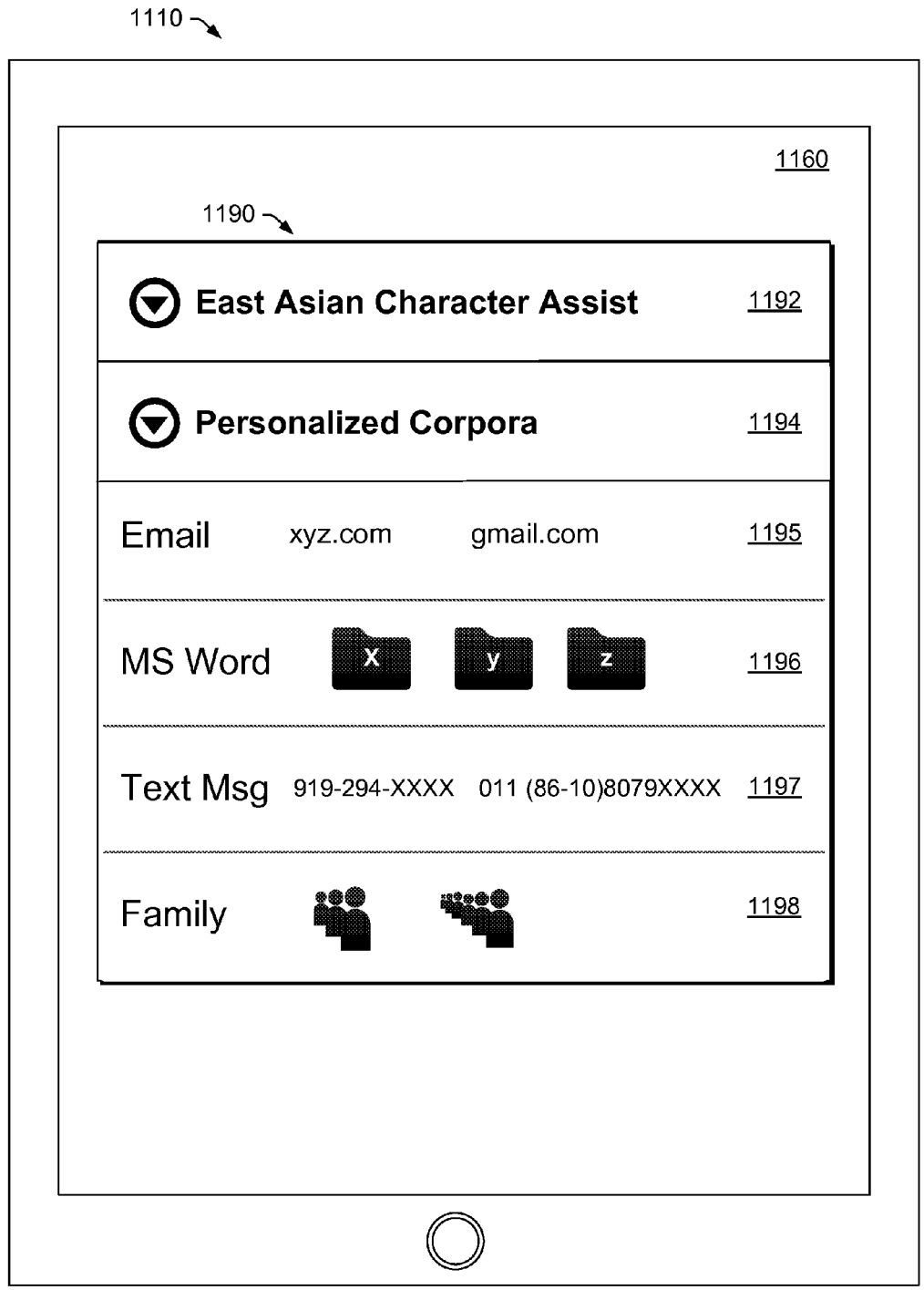
FIG. 11 is a diagram of an example of a device and an example of a graphical user interface.

FIG. 11 shows an example of a device 1110 that includes a display 1160 and an example of a graphical user interface 1190. As shown, the GUI 1190 includes an East Asian Character Assist field 1192 that may, for example, provide a drop down menu. As shown, the GUI 1190 can include a Personalized Corpora field 1194 that may, for example, provide a drop down menu (e.g., or other form of menu of selectable items). In the example of FIG. 11, a field 1195 includes one or more email associated corpora (e.g., optionally based at least in part on domain name information, etc.), a field 1196 includes one or more word processing application associated corpora (e.g., optionally based at least in part on folder, file path, etc.), a field 1197 includes one or more text messaging application associated corpora (e.g., optionally based at least in part on an address, a phone number, a portion of a phone number, etc.) and a field 1198 for defined types of entities such as "family" (e.g., or friends, associates, colleagues, etc.).

As an example, analysis circuitry such as, for example, the analysis circuitry 444 of FIG. 4, may leverage existing operating system functions. For example, consider a so-called "Desktop search tool" that may search within files of a device. As an example, a tool may search text information, which may be, for example, in one or more of web browser history, e-mail archives, text documents, etc.

As an example, a personalized corpus may be generated using information generated by a search tool. For example, such a search tool may build and maintain an index database as to text within files (e.g., of a file system). As an example, an analysis of information generated by a search tool may allow for generation of one or more sets of frequency information such as, for example, the frequency information 446-1, 446-2 and 446-N of FIG. 4. As a search tool may operate based at least in part on information of a file system, information may be "segregated", for example, based on folders (e.g., as may be associated with one or more applications), based on file extensions (e.g., as may be associated with one or more applications), etc.

Figure 12:
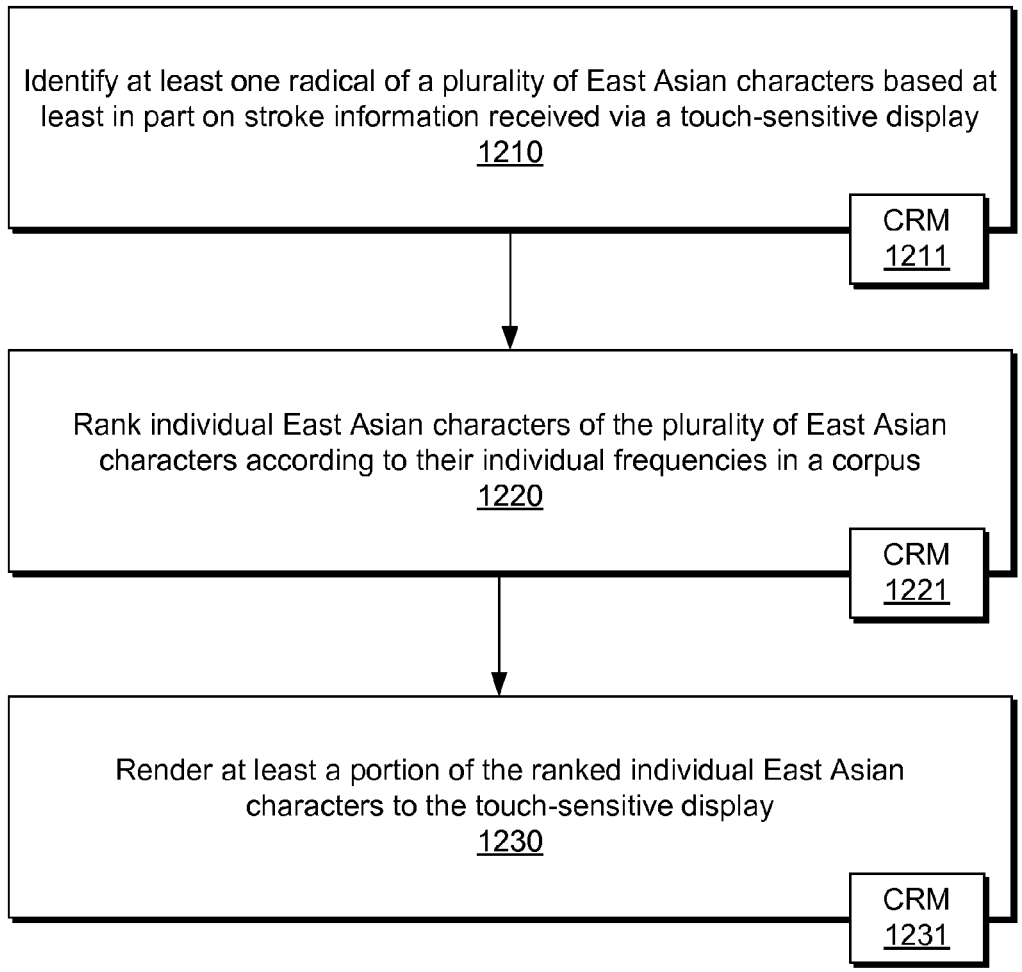
FIG. 12 is a diagram of an example of a method.

FIG. 12 shows an example of a method 1200 that includes an identification block 1210 for identifying at least one radical of a plurality of East Asian characters based at least in part on stroke information received via a touch-sensitive display; a rank block 1220 for ranking individual East Asian characters of the plurality of East Asian characters according to their individual frequencies in a corpus; and a render block 1230 for rendering at least a portion of the ranked individual East Asian characters to the touch-sensitive display.

Figure 13:
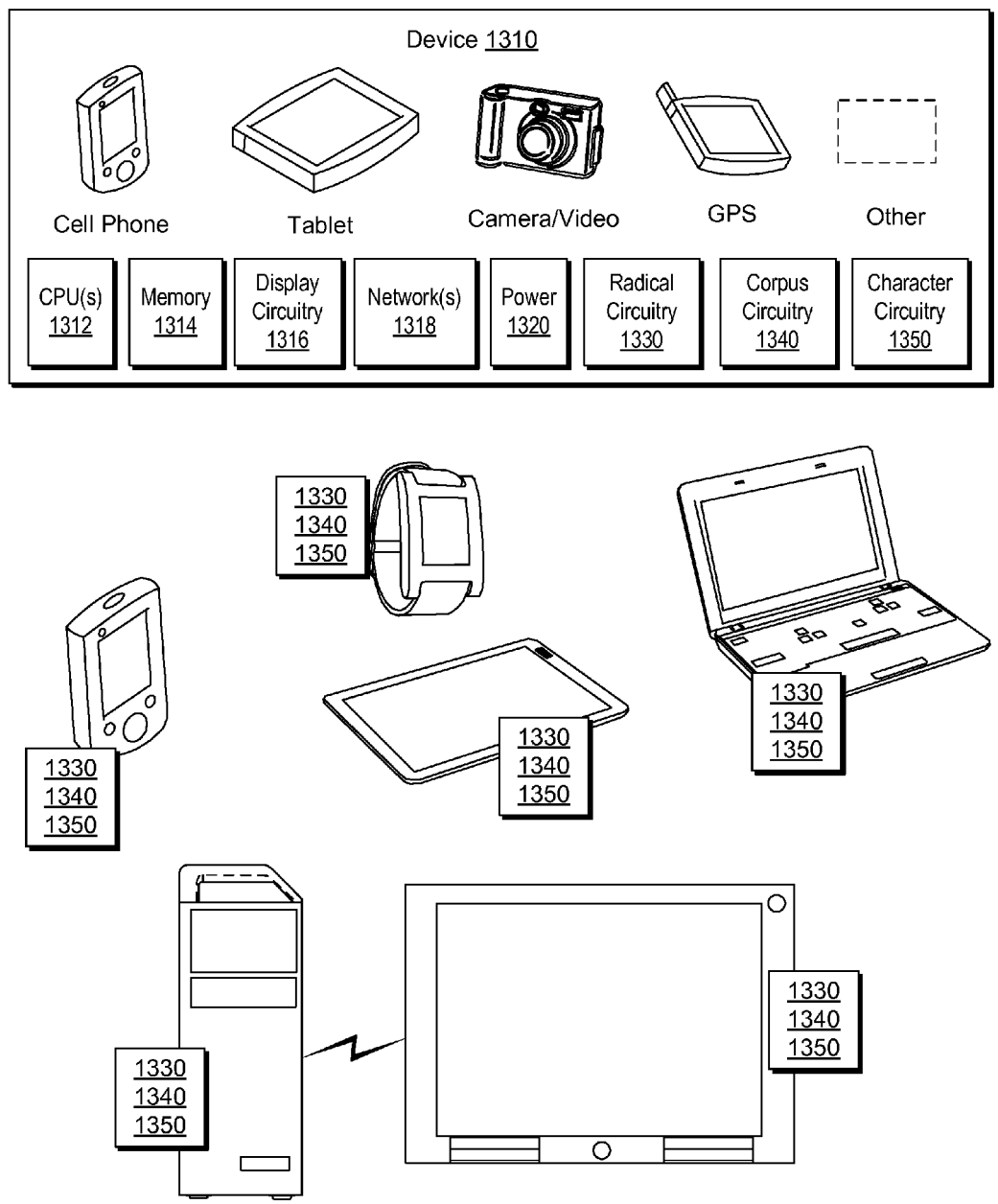
FIG. 13 is a diagram of an example of a device.

FIG. 13 shows an example of a device 1310. As an example, the device 1310 may include one or more processors 1312, memory 1314, display circuitry 1316 (e.g., a touch sensitive display), one or more network interfaces 1318 (e.g., including one or more cell network interfaces, etc.), power circuitry 1320 (e.g., optionally including a power source such as a battery, etc.), radical circuitry 1330, corpus circuitry 1340 and character circuitry 1360. As shown, the device 1310 may be configured, for example, as a watch, a phone, a tablet, a notebook, a desktop system, a camera, a GPS device or other device.

As an example, a method can include identifying at least one radical of a plurality of East Asian characters based at least in part on stroke information received via a touch-sensitive display; ranking individual East Asian characters of the plurality of East Asian characters according to their individual frequencies in a corpus; and rendering at least a portion of the ranked individual East Asian characters to the touch-sensitive display. In such an example, identifying at least one radical can include associating the stroke information with a radical that includes a Unicode and, for example, ranking individual East Asian characters can include accessing a Unicode range for the Unicode where the Unicode range corresponds to the individual East Asian characters. As an example, a device may include memory that stores a lookup table (LUT) or other data structure. In such an example, the stored data structure may include entries ordered, for example, according to frequency information derived from a personalized corpus or personalized corpora.

As an example, a method may include accessing a lookup table to determine a number of characters that include a radical and, for example, to optionally determine an order of at least a portion of the characters, which may be an order based at least in part on frequency information (e.g., of a corpus, which may be a personalized corpus).

As an example, stroke information can include stroke information for a complete radical. In such an example, the radical may be a radical of a single stroke or a radical of multiple strokes. As an example, stroke information may include information for a stroke that exists in a plurality of radicals.

As an example, a method can include ranking individual East Asian characters according to their individual frequencies of usage in a personalized corpus. In such an example, the personalized corpus may be associated with one or more of a word processing application, an email application, communications for a group where the group includes at least two members.

As an example, a corpus may be a corpus associated with at least a portion of an email address. For example, for an email address "susan.li@xyz.com", the portion "susan", the portion "li", the portion "xyz", the portion "corn" may be portions that are associated with one or more corpora. As an example, a corpus may be generated and/or frequency information derived therefrom for communications with addresses that include the domain name "xyz.com". As an example, a corpus may be generated and/or frequency information derived therefrom for communications with an individual "Susan Li", whether via email, text message, etc. As an example, a corpus may be generated and/or frequency information derived therefrom for communications with individuals that include the name "Li", whether via email, text message, etc. For example, such a corpus may include text of communications to members of a family with the name "Li". In such an example, frequency information may be derived from the corpus and used, for example, to rank character candidates responsive to identification of a radical based at least in part on stroke information input via a touch sensitive display.

As an example, stroke information may be associated with a type of application. As an example, a method may include selecting a corpus from a plurality of corpuses based at least in part on the type of application.

As an example, a method can include receiving a selection that selects one of a plurality of ranked individual East Asian characters. In such an example, a method may include updating frequency information in the corpus based at least in part on the selection. For example, where a communication is an email communication to an address with a particular domain name and where a corpus is associated with that domain name, upon receipt of a selection of a character, frequency information may be updated (e.g., to indicate that another occurrence of that character). As an example, upon transmission of an email communication, the text of that communication may be entered into a corpus and, for example, analyzed, parsed, etc. to provide for updating frequency information.

As an example, a corpus and/or frequency information may include a "forgetting factor". For example, as time passes, a person may alter his or her vocabulary. As an example, consider a person working on a project pertaining to audio processing for automobiles, completing the project and then working on a project pertaining to displays for hand-holdable mobile devices. In such an example, a forgetting factor approach may act to forget or, for example, weigh "older" information in a corpus with lesser weights than "newer" information in a corpus. As another example, consider a social context where social media communications (e.g., with friends, etc.) may change rapidly as to the latest fad. In such an example, a forgetting factor may be short.

As an example, a device may include a reset option for resetting a corpus. As an example, a device may include a look-back window specified in days, months, etc. as to entries for a corpus. In such an example, old text may be excluded from a corpus and analysis to generate frequency information. As an example, a corpus and/or frequency information may be updated according to a schedule (e.g., once a week, once a month, etc.).

As an example, a method may include receiving stroke information via stylus-enabled digitizer circuitry of a display. Such a display may be considered a touch sensitive display; noting that a stylus may "interact" with the digitizer circuitry without physical contact with a surface of the display.

As an example, a method can include rendering at least a portion of a plurality of ranked individual East Asian characters to a display where rendering can include rendering at least one of the ranked individual East Asian characters in a phrase.

As an example, an apparatus can include a processor; memory operatively coupled to the processor; a touch-sensitive display operatively coupled to the processor; radical circuitry that identifies at least one radical of a plurality of East Asian characters based at least in part on stroke information received via the touch-sensitive display; corpus circuitry that ranks individual East Asian characters of the plurality of East Asian characters according to their individual frequencies in a corpus; and character circuitry that renders at least a portion of the ranked individual East Asian characters to the touch-sensitive display. In such an example, the radical circuitry may associate the stroke information with a radical that includes a Unicode and the corpus circuitry that ranks individual East Asian characters may access a Unicode range for the Unicode where the Unicode range corresponds to the individual East Asian characters.

As an example, one or more computer-readable storage media can include processor-executable instructions that instruct a computing device where the instructions include instructions to: identify at least one radical of a plurality of East Asian characters based at least in part on stroke information received via the touch-sensitive display; rank individual East Asian characters of the plurality of East Asian characters according to their individual frequencies in a corpus; and render at least a portion of the ranked individual East Asian characters to the touch-sensitive display. In such an example, the instructions to identify can include instructions to associate the stroke information with a radical that includes a Unicode and the instructions to rank can include instructions to access a Unicode range for the Unicode where the Unicode range corresponds to the individual East Asian characters.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium or a machine-readable medium may be a storage device (e.g., a memory card, a storage disk, etc.) and referred to as a computer-readable storage medium or a machine-readable storage medium that is not a carrier wave (e.g., a non-transitory medium).

Figure 14:
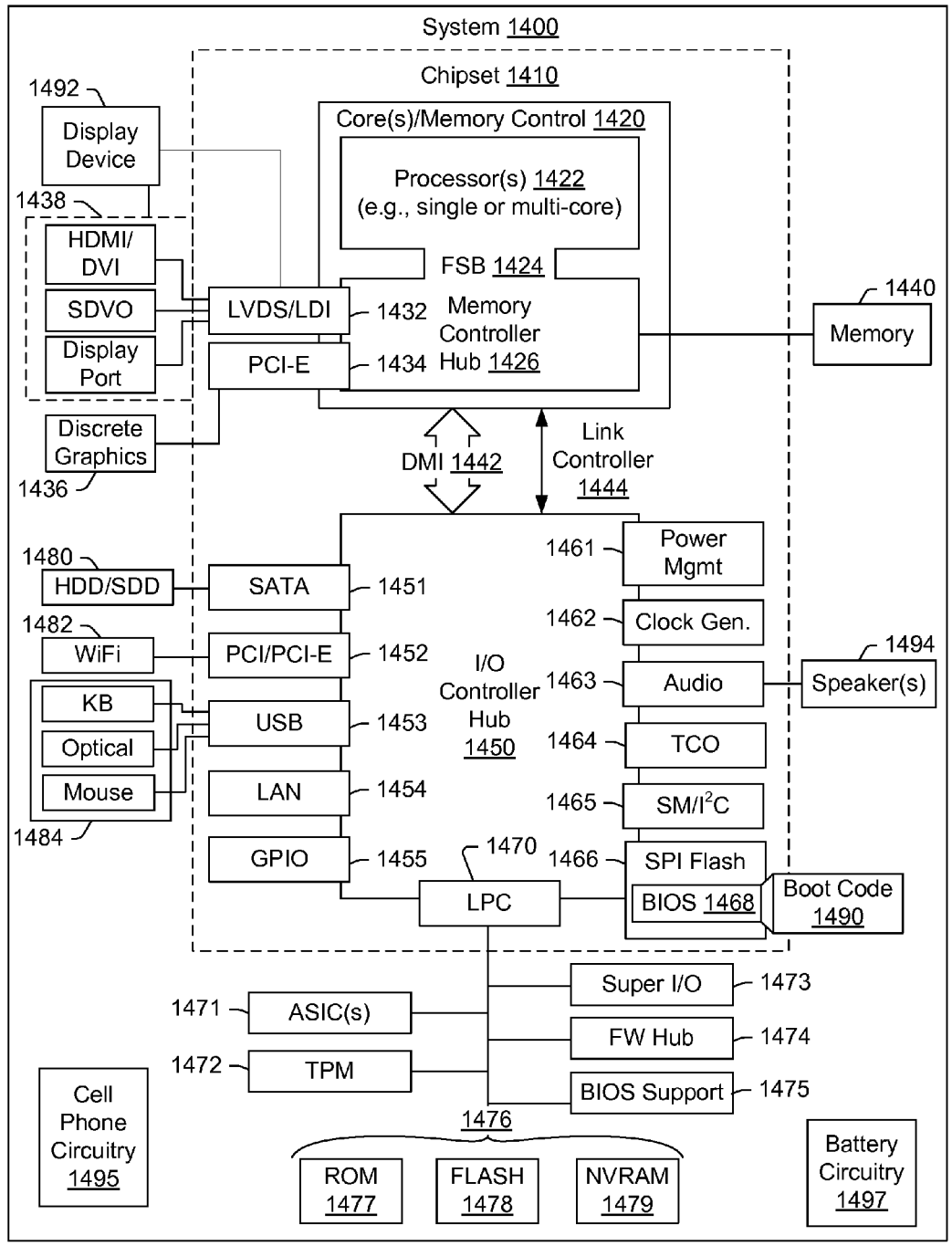
FIG. 14 is a diagram of an example of a system.

While various examples of circuits or circuitry have been discussed, FIG. 14 depicts a block diagram of an illustrative computing system 1400. As an example, the system 1400 may be a system of components that may be included in a device. The system 1400 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1400. As described herein, a device (see, e.g., the device 110, the device 510, the device 710, etc.) may include at least some of the features of the system 1400.

As shown in FIG. 14, the system 1400 includes a so-called chipset 1410. A chipset refers to a group of integrated circuits, or chips, that are designed to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture. As an example, a chipset may be configured as a platform controller hub (PCH), for example, the memory controller hub (MCH) 1426 may be considered a northbridge and the I/O controller hub (ICH) 1450 may be considered a southbridge where the MCH 1426 and the ICH 1450 may be components of the platform controller hub (PCH) (e.g., a PCH architecture).

As shown in FIG. 14, the memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory". As an example, one or more processors may include circuitry for memory access, for example, to access system memory.

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics (e.g., rendering of graphics to a display, etc.).

The I/O controller hub 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O controller hub 1450 may include integrated gigabit Ethernet controller lines multiplexed with a PCI-E interface port. Other network features may operate independent of a PCI-E interface.

The interfaces of the I/O controller hub 1450 provide for communication with various devices, networks, etc. For example, the SATA interface 1451 provides for reading, writing or reading and writing information on one or more drives 1480 such as HDDs, SDDs or a combination thereof. The I/O controller hub 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, a touchpad, mice and various other devices (e.g., cameras, phones, storage, media players, etc.). On or more other types of sensors may optionally rely on the USB interface 1453 or another interface (e.g., I²O, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468.

Again, as described herein, a satellite, a base, a server or other machine may include fewer or more features than shown in the system 1400 of FIG. 14. Further, the system 1400 of FIG. 14 is shown as including cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an I²C interface (see, e.g., the SM/I²C interface 1465), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
  receiving stroke information via a touch-sensitive display wherein the stroke information is associated with a type of application, a user account and an address;
  selecting a personalized corpus from a plurality of corpuses based at least in part on the type of application, the user account and the address wherein the personalized corpus is based on text within files of the type of application that are associated with the user account and the address;
  identifying at least one radical of a plurality of East Asian characters based at least in part on stroke information;
  ranking individual East Asian characters of the plurality of East Asian characters according to their individual frequencies in the personalized corpus; and
  rendering at least a portion of the ranked individual East Asian characters to the touch-sensitive display.

2. The method of claim 1 wherein the identifying at least one radical comprises associating the stroke information with a radical that comprises a Unicode and wherein the ranking individual East Asian characters comprises accessing a Unicode range for the Unicode wherein the Unicode range corresponds to the individual East Asian characters.

3. The method of claim 1 wherein the stroke information comprises stroke information for a complete radical.

4. The method of claim 3 wherein the complete radical comprises a plurality of strokes.

5. The method of claim 1 wherein the stroke information comprises stroke information for a single stroke that exists in a plurality of radicals.

6. The method of claim 1 wherein the personalized corpus is a personalized corpus associated with a word processing application.

7. The method of claim 1 wherein the personalized corpus is a personalized corpus associated with an email application.

8. The method of claim 1 wherein the personalized corpus is a personalized corpus associated with communications for a group wherein the group comprises at least two members.

9. The method of claim 1 wherein the personalized corpus is a personalized corpus associated with at least a portion of an email address.

10. The method of claim 1 further comprising receiving a selection that selects one of the ranked individual East Asian characters.

11. The method of claim 10 further comprising updating frequency information in the personalized corpus based at least in part on the selection.

12. The method of claim 1 further comprising receiving the stroke information via stylus-enabled digitizer circuitry of the display.

13. The method of claim 1 wherein the rendering at least a portion of the ranked individual East Asian characters to a display comprises rendering at least one of the ranked individual East Asian characters in a phrase.

14. The method of claim 1 comprising accessing a lookup table.

15. An apparatus comprising:
  a processor;
  memory operatively coupled to the processor;
  a touch-sensitive display operatively coupled to the processor;
  reception circuitry that receives stroke information via a touch-sensitive display wherein the stroke information is associated with a type of application, a user account and an address;
  selection circuitry that selects a personalized corpus from a plurality of corpuses based at least in part on the type of application, the user account and the address wherein the personalized corpus is based on text within files of the type of application that are associated with the user account and the address;
  radical circuitry that identifies at least one radical of a plurality of East Asian characters based at least in part on stroke information;
  corpus circuitry that ranks individual East Asian characters of the plurality of East Asian characters according to their individual frequencies in the personalized corpus; and
  character circuitry that renders at least a portion of the ranked individual East Asian characters to the touch-sensitive display.

16. The apparatus of claim 15 wherein the radical circuitry associates the stroke information with a radical that comprises a Unicode and wherein the corpus circuitry that ranks individual East Asian characters accesses a Unicode range for the Unicode wherein the Unicode range corresponds to the individual East Asian characters.

17. One or more computer-readable storage media comprising processor-executable instructions that instruct a computing device wherein the instructions comprise instructions to:
receive stroke information via a touch-sensitive display wherein the stroke information is associated with a type of application, a user account and an address;
select a personalized corpus from a plurality of corpuses based at least in part on the type of application, the user account and the address wherein the personalized corpus is based on text within files of the type of application that are associated with the user account and the address;
identify at least one radical of a plurality of East Asian characters based at least in part on stroke information;
rank individual East Asian characters of the plurality of East Asian characters according to their individual frequencies in the personalized corpus; and
render at least a portion of the ranked individual East Asian characters to the touch-sensitive display.

18. The one or more computer-readable storage media of claim 17 wherein the instructions to identify comprise instructions to associate the stroke information with a radical that comprises a Unicode and wherein the instructions to rank comprise instructions to access a Unicode range for the Unicode wherein the Unicode range corresponds to the individual East Asian characters.

19. A method comprising:
receiving stroke information via a touch-sensitive display wherein the stroke information is associated with a messaging application, a user account and an address;
selecting a personalized corpus from a plurality of corpuses associated with the messaging application and the user account based at least in part on the address wherein the personalized corpus is based on text within files that are associated with the user account and the address;
identifying at least one radical of a plurality of East Asian characters based at least in part on stroke information;
ranking individual East Asian characters of the plurality of East Asian characters according to their individual frequencies in the personalized corpus; and
rendering at least a portion of the ranked individual East Asian characters to the touch-sensitive display.

20. The method of claim 19 wherein the address comprises a phone number.

\* \* \* \* \*